I. E. STEVENS.
CAR.
APPLICATION FILED OCT. 15, 1913.

1,196,895.

Patented Sept. 5, 1916.

WITNESSES

INVENTOR
Ira E. Stevens

UNITED STATES PATENT OFFICE.

IRA E. STEVENS, OF PITTSBURGH, PENNSYLVANIA.

CAR.

1,196,895.  Specification of Letters Patent. Patented Sept. 5, 1916.

Application filed October 15, 1913. Serial No. 795,341.

*To all whom it may concern:*

Be it known that I, IRA E. STEVENS, residing at Pittsburgh, in the county of Allegheny and State of Pennsylvania, citizen of the United States, have invented or discovered certain new and useful Improvements in Cars, of which improvements the following is a specification.

The invention described herein relates to certain improvements in means for attaching wheels to cars, the improvement being especially applicable to mining cars, and has for its object a construction wherein the bearings for the axles are rigidly tied together.

The invention is hereinafter more fully described and claimed.

Figure 1:
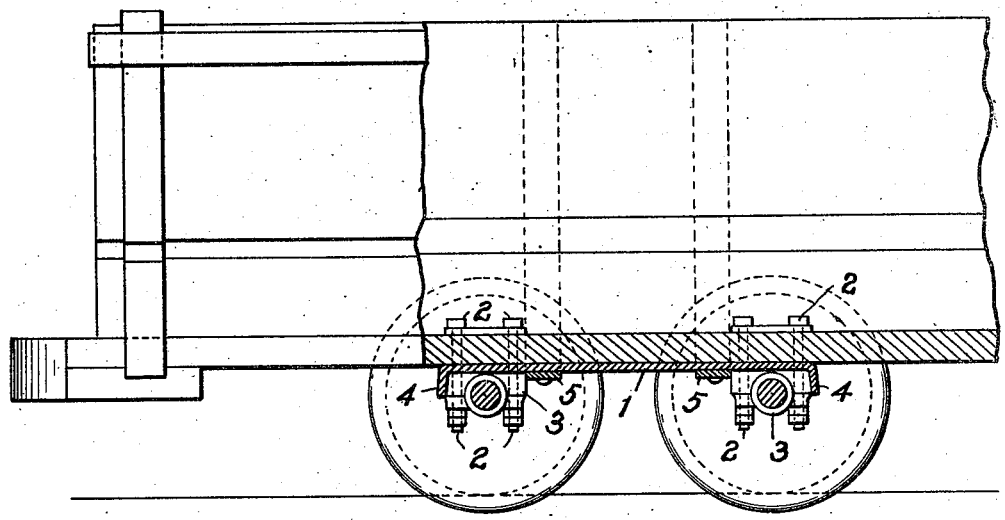
Figure 2:
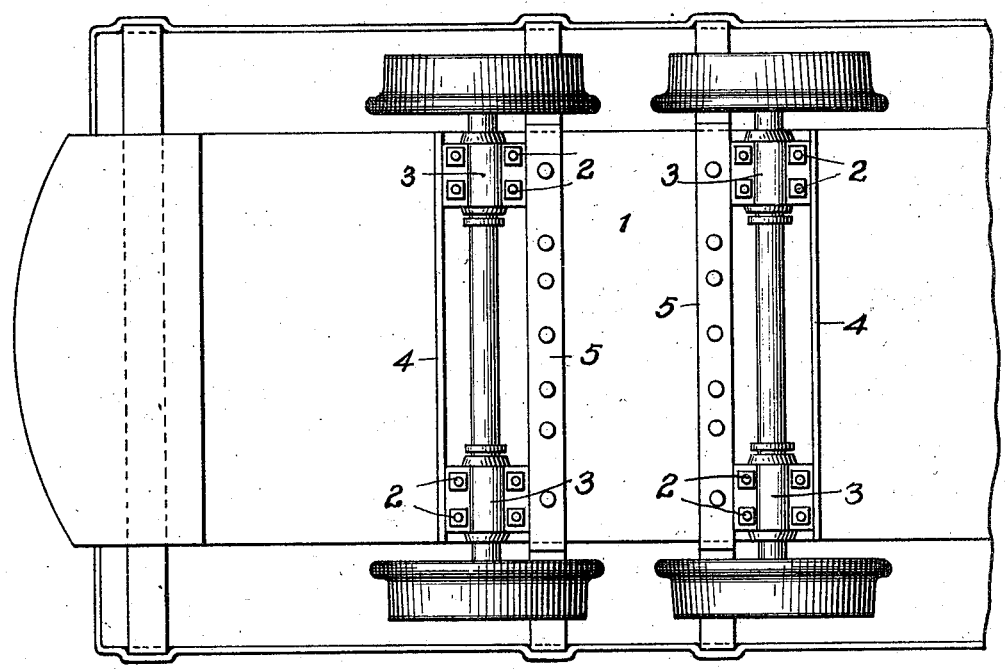

In the accompanying drawing forming a part of this specification, Figure 1 is a view partly in section and partly in elevation of a car having my improvement applied thereto, and Fig. 2 is a plan view of the car inverted.

In order that a car may move with a minimum resistance along rails it is necessary that the wheel axles should be parallel with each other and at right angles to the direction of movement. Great difficulty has been experienced in maintaining these relations in mining cars by reason of the short bearings which the bolts employed for securing the axle bearings in position have in the comparatively thin planks forming the bottom of the car, and also by reason of the bolt holes in the planks becoming enlarged.

In the practice of my invention the body of the car is constructed in the usual or any suitable manner known in the art. On the bottom of the car is arranged a metal plate 1 of substantial thickness having a length somewhat greater than the desired distance between axles and a width approximately equal to the desired spacing of the bearings for each axle. This plate may be secured to the bottom planks of the car in any suitable manner, but preferably by means of bolts 2, whereby the bearings 3 for the axles are secured in position. As will be seen by reference to Fig. 1, the bearings are preferably made in sections, which are held together by the bolts 2. As the bolts for all the bearings pass through the plate 1 the latter will maintain the axles parallel and the bearings for each axle in the desired relation.

As shown in the drawings it is preferred to turn flanges 4 on the ends of the plate thereby providing stops which will prevent any lateral separation of the axles. The bearings for one axle are preferably held as against movement toward those of the other axle by shoulders or abutments 5 on the plate, said shoulders or abutments being preferably formed by metal straps riveted to the plate inside the bearings and their ends extending up along both sides of the car.

It is characteristic of my improvement that any thrust or strains applied to any of the wheels is transmitted to and sustained by all the bearings and the bolts whereby they are attached to the car body and hence each bearing will be maintained in proper relation to all the other bearings.

I claim herein as my invention:

1. A car body having in combination therewith a pair of axles, bearings for said axles, and a metal plate connected to each of the bearings.

2. A car body having in combination therewith a pair of axles, bearings for said axles, a metal plate interposed between the bearings and the bottom of the car, and bolts passing through the plate for securing the bearings to the car.

3. A car body having in combination therewith a pair of axles, a plate adapted to be secured to the car body and provided with shoulders or abutments extending transversely of the car, and bearings for the axles arranged between adjacent abutments.

4. A car body having in combination therewith a pair of axles, a plate having at its ends abutments formed integral with the plate, bearings for the axles seated against said abutments, and straps extending across the plate and bearing against the inner sides of the axle bearings.

5. In a running gear for cars, the combination with the bottom of a car, of a metal plate attached thereto, journal boxes for the axles of the car which are connected to the corners of said plate which holds the axles in parallelism, and means to reinforce said plate transversely of the car while leaving its body free to flex lengthwise of the car as and for the purpose described.

6. In a running gear for mine cars, the combination with the bottom of a car, of a flexible metal plate attached to the underside thereof, journal boxes for the axles of the car which are connected near the ends of said plate which holds the axles in parallelism, the axles being spaced from said plate, means to reinforce said plate transversely of the car adjacent to the axles while leaving the body of the plate free to flex and vibrate as and for the purpose described.

7. In a running gear for mine cars, the combination with the bottom of the car, of a flexible metal plate which, near its ends, is connected to the underside of the bottom of the car and has its middle portion left free of rigid connection to said bottom, means to attach journal boxes of both car axles to said plate near its ends, the axles being spaced from the plate, and means to reinforce the plate transversely adjacent to each axle, substantially as described.

In testimony whereof, I have hereunto set my hand.

IRA E. STEVENS.

Witnesses:
ALICE A. TRILL,
F. B. JOYCE.